A. T. TIRADO.
CHILD'S VEHICLE.
APPLICATION FILED NOV. 1, 1920.
1,385,761.
Patented July 26, 1921.
2 SHEETS—SHEET 1.
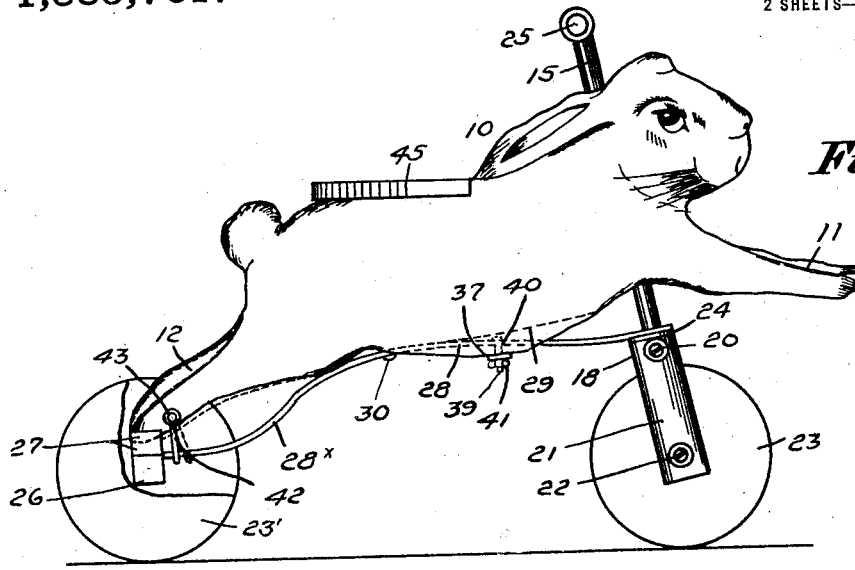
Fig. 1.
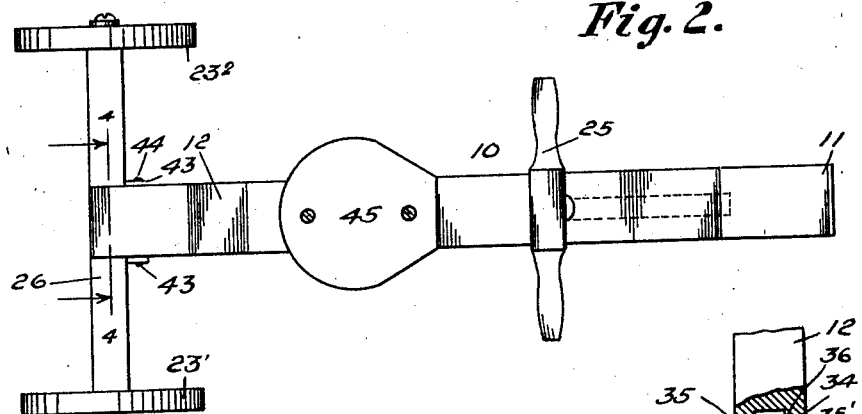
Fig. 2.
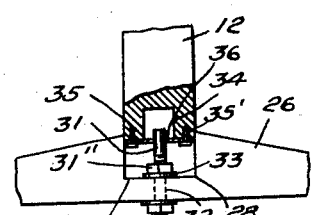
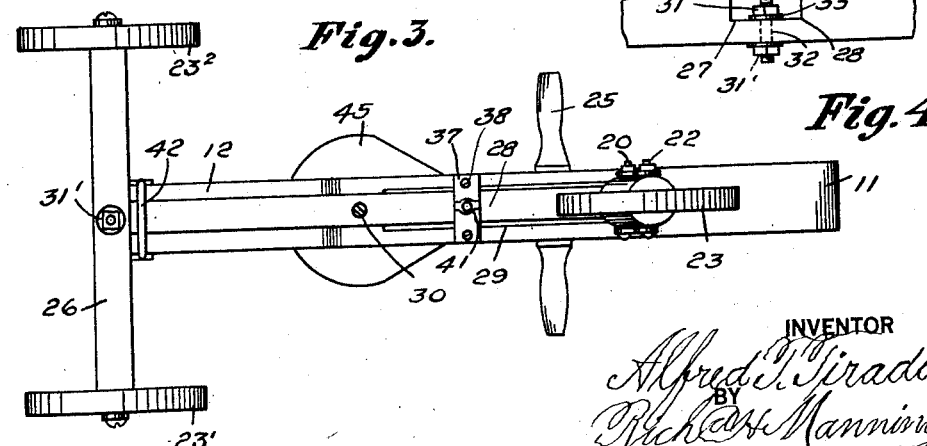
Fig. 3.
Fig. 4.
INVENTOR
Alfred T. Tirado
BY
Richard Manning
ATTORNEY

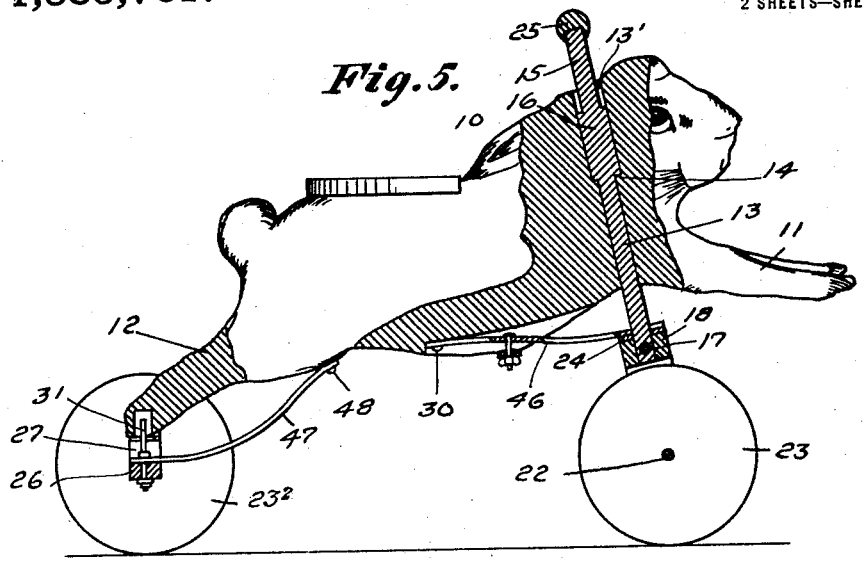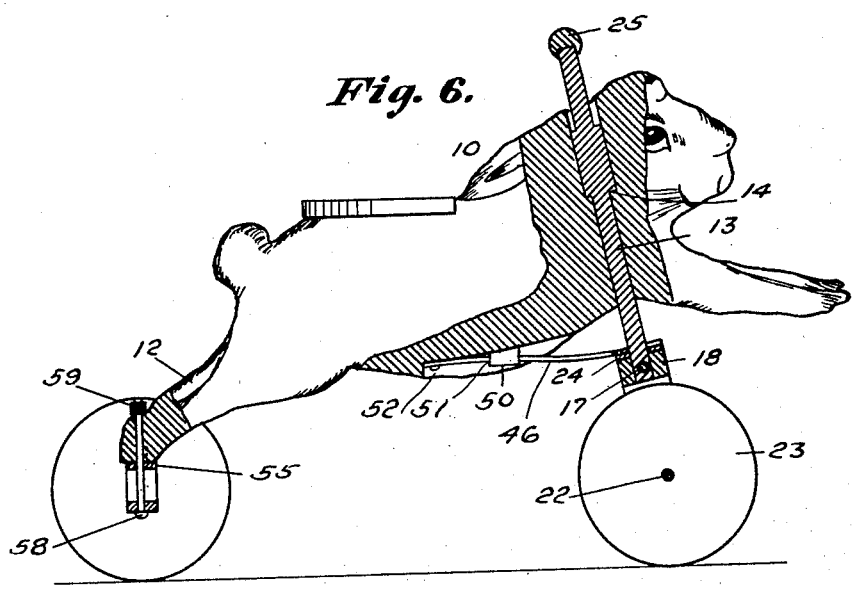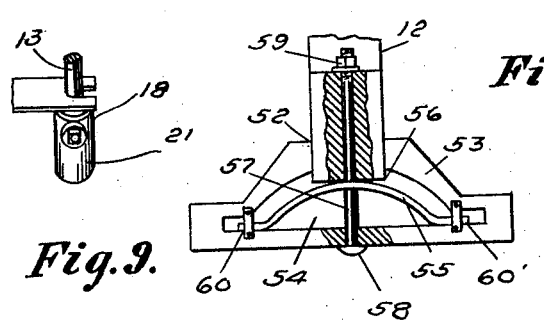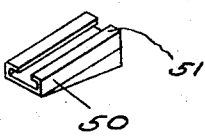

UNITED STATES PATENT OFFICE.

ALFRED T. TIRADO, OF KANSAS CITY, MISSOURI, ASSIGNOR OF ONE-HALF TO FRANK C. SCHAEFFER, OF KANSAS CITY, MISSOURI.

CHILD'S VEHICLE.

1,385,761.  Specification of Letters Patent.  Patented July 26, 1921.

Application filed November 1, 1920. Serial No. 420,950.

*To all whom it may concern:*

Be it known that I, ALFRED T. TIRADO, a citizen of the United States of America, residing at Kansas City, in the county of Jackson and State of Missouri, have invented certain new and useful Improvements in Children's Vehicles; and I do hereby declare that the following is a full, clear, and exact description of the invention, reference being had to the accompanying drawings, forming a part of this specification.

The invention relates to the class of vehicles designed principally for children's use and propelled by foot power, and it has for its object, First. Means for absorbing and diminishing the shock communicated to the vehicle when meeting obstructions, as well as to the person.

Second. An oscillating support upon which the body of the vehicle is mounted to oscillate and supported by the forward and rear axles.

Third. A vehicle body supported resiliently between guiding axes to motion at its respective ends.

Fourth. Means for adjusting the power of recoil of a spring supported body of a vehicle whereby the variance in load may be compensated, and Fifth. To provide for oscillations and the means for its control in the body of the vehicle within the limits of safety to the child.

The invention consists in the novel construction and combination of parts such as will be first fully described and then specifically pointed out in the claims.

In the drawings,

Figure 1 is a side view in elevation of a child's vehicle, showing the invention.

Fig. 2 is a plan view.

Fig. 3 is a view of the vehicle in a reverse position to that seen in Fig. 2.

Fig. 4 is a detail view of a broken portion of the rear end of the body and rear axle, showing the guiding axes of motion, and the rear end of the body supporting spring taken on line 4—4 on Fig. 2.

Fig. 5 is a side illustrative view of the vehicle, similar to that seen in Fig. 1, parts at the forward and rear ends of the body being broken away to show the steering shaft and its enlargement, the rear and forward ends of the body being shown supported by a separate spring and without the rear adjusting loop or yoke.

Fig. 6 is a side view of the vehicle, similar to that seen in Fig. 5, showing a modification of the means of support of the rear end of the body upon the axle, and also for adjusting the power of the forward body supporting spring.

Fig. 7 is a detail view of the rear end of the body and a portion of the rear axle, as seen in Fig. 6, showing a modified spring support on the rear axle.

Fig. 8 is a detail view in perspective of the modified device for increasing the tension of the body supporting spring to be used interchangeably with the device seen in Figs. 1-5.

Fig. 9 is a detail view showing the forked end of the spring bar on the forked post.

Similar numerals of reference indicate corresponding parts in all the figures of the drawings.

The body 10 of the vehicle, as shown, consists of a board of a suitable length and width, from which the outlines of an animal, such as a dog or rabbit, are cut, the forward end of the body being the forward legs 11, and the rear end the hind legs 12, of the object as shown.

In the forward portion of the body, in rear of the leg extensions 11, is a rearwardly inclined opening 13 extending from the lower surface of the body upwardly part way toward the upper edge of the body 10 to a shoulder 14, from which point to the upper surface of the body the opening is increased in circumference as at 13′, see Fig. 5. A steering shaft 15 is provided with an enlargement 16 nearly the same circumference as the opening 13′, the lower portion of the enlargement forming a shoulder and bearing upon the shoulder 14. The lower end of shaft 15 extends downwardly within the opening 13 to the upper end 18 of a forked axle post located a short distance below the lower surface of the body 10 and is secured therein by a nut and bolt 20, see Figs. 1 and 3. The forked portions 21 of the post extend downwardly in alinement with shaft 15 and between said portions is mounted axially on bolt and nut 22, the forward wheel 23 of the vehicle.

Upon the upper surface of the upper end 18 of the bearing post, is a washer 24 extending around shaft 15. Upon the upper end of shaft 15 is the cross or hand bar 25.

26 is the rear axle having a notch 27 intermediate its ends, upon which ends are mounted rotatably separate wheels 23' and 23².

A bowed or curved spring plate or bar 28, supports the body 10 of the vehicle the forward end of which is forked at 28', and the forked ends extend on each side of shaft 15 and bear on the washer 24 on the upper end 18 of the forked bearing for the front wheel 23. This end of the spring bar counteracts the downward movement of the body 10.

The rear end of the spring bar 28 extends rearwardly within a transverse groove 29 on the lower surface of the body 10 of the vehicle, and is secured rigidly within the groove at a point approximately equidistant from its forward end bearing to the rear axle 26 by means of a screw fastening 30, and from said fixed point, the said rear end of bar 28 is extended rearwardly a short distance within the groove 29 thence bent downwardly and curved outwardly at 28*, thence extending within the bottom of notch 27 in the rear axle 26, and is secured rigidly to the axle by means of a long bolt 31 screw-threaded part way its length. This bolt extends upwardly through an opening 32 in the axle into the transverse groove 27 through an opening 33 in the rear end of the spring bar 28, and thence upwardly a considerable distance above the line of the upper surface of axle 26. Upon the lower end of screw bolt 31, is a nut 31' bearing upon the lower surface of the axle, and upon the portion of the screw bolt in groove 27 is a nut 31'' bearing on the upper surface and rear end of spring bar 28.

The rear end 12 of the vehicle body, fashioned in resemblance to the hind feet of the object is provided upon its lower surface with a longitudinal groove 34. A plate 35 is secured to the said lower surface of said rear end of the body by screws 35' and extends over the groove 34. In said plate 35 is an opening 36, which received the upper end of the bolt 31.

Thus mounted, the body 10 is permitted forward and rear and lateral oscillation between the forward and rear axes, of rising and falling motion with freedom of rocking movement from its resilient point of support, its resistance to the variable weight of the persons astride the body being within itself. That is, the avoirdupois of one child would permit a slight recoil in the spring 28, while that of another of lesser weight would receive all of its benefits, besides the resistance to shocks received by the vehicle.

In order to increase the resisting power of the spring bar 28, a plate 37 is secured to the lower surface of body 10 at a point the requisite distance forward of the screw 30 toward the forked ends of the spring bar 28 to afford the proper adjustment. This plate extends over the groove 27, its ends being secured by screws 38 to the body 10 each side of the groove, see Fig. 3. An adjusting screw bolt 39 is extended through an opening 40 in the spring bar 28, its head bearing on the upper surface of said plate, thence said bolt extends downwardly through an opening 40 in the plate 37, and upon said bolt is an adjusting thumb nut 41 bearing upon the lower surface of said plate.

In order to control the upward movement resiliently of the rear end portion of the body 10, and also prevent the lateral oscillations of the body 10, a pivoted adjusting U-loop 42 extends over the rear end of the spring bar 28 a short distance forward of the rear axle 26. The upper ends of the loop are provided with eyes 43, through which eyes and the lower portion of said rear end 12 of the body 10 extends a securing bolt 44.

A seat 45 is secured to the upper surface of the upper edges of body 10, affording a broader surface thereto.

Instead of a single spring bar or plate, as seen in Fig. 1, separate springs 46 and 47 may be employed, as seen in Fig. 5, in which the construction of the various parts of the body and spring is the same as in Fig. 1, the spring bar in Fig. 5 being separated from the forward end of the bar immediately in rear of the screw 30, and the forward end of the separated portion secured to the body of the vehicle by the screws 48 near the rear leg formation of the body. This rear spring 47 is given a like curvature to that of the rear end of spring bar 28, in Fig. 1, permitting an oscillating movement between separate points of attachment of the separate springs, the adjusting loop being dispensed with in this illustration.

Instead of employing a spring extending from the body 10 to the rear axle, this may be dispensed with and a spring support provided for the rear end of the body within the axle, as seen in Figs. 6 and 7.

In this latter construction, the forward end of the body 10 is similar to that shown in Fig. 5, and supported by the spring plate 46. The tensioning device for the body supporting spring as seen in Fig. 6, consists of an adjustable wedge operating between the spring and the body 10. This wedge is provided with flanges 51 upon its upper surface which are bent inwardly upon the upper surface of spring 46. The wedge may be used interchangeably with the spring tensioning device seen in Figs. 1 and 5. When the wedge is moved rearwardly by the hand, it forms a shifting fulcrum for the spring 46, forward of the screw attachment 52, of the spring bar, with the body 10, increasing its power of resistance to either the weight applied to the body 10, the oscillations of the body, or shock from obstructions in the path of the wheels. The rear end of the body 10, represented by the hind legs 12 of the object in Figs. 6 and 7, extends downwardly within a transverse groove 52 in the upward extension 53 of the central portion of the axle, beneath which groove is a longitudinal opening 54 in which is an upwardly curved spring 55, the ends of which are permitted an extension within the groove upon the compression of the spring. Above groove 54 is a transverse opening 56 extending in the arc of a circle about the spring 55 and communicating with groove 54. Through the axle extends upwardly a screw bolt 57 which is provided with a head 58, the bolt passing through an opening in the curved spring 55, thence through the rear end 12 of the body 10 and upon the upper end of the bolt is an adjusting nut 59.

The ends of the spring 55 are retained within groove 54 by the plates 60 60', secured in a vertical position to the rear portion of the axle and extending past groove 54. The adjusting loop 42 in Fig. 1, when the regulation of the tension of the rear end of the spring bar is required, is moved forward into the dotted position, thus lessening the vibration of the spring bar and exercises its tension, and the same application of the yoke bar may be made to the forward end of the spring bar. The invention is applicable to various kinds of vehicles for all purposes as well as to children's vehicles, with such other modifications as are within the scope of the appended claims.

Having fully described my invention, what I now claim as new and desire to secure by Letters Patent is, 1. In a vehicle comprising forward and rear axles, wheels supporting said axles, guiding means for the forward axles and a vehicle body, the combination with the axles of a body supporting spring plate mounted at the respective ends upon the respective forward and rear axles and adapted to constitute an oscillating support for said body and an attachment connecting the body of the vehicle with the spring plate between its respective forward and rear ends whereby combined oscillations are afforded the body of the vehicle with its spring support.

2. In a vehicle comprising forward and rear axles, wheels supporting said axles, guiding means for the forward axle and a vehicle body, the combination with the axles of an upwardly curved or bowed spring plate, yieldingly mounted and connected at its respective ends with the respective forward and rear axles and an attachment connecting the vehicle body with the bowed spring plate, intermediate the respective forward and rear ends of said vehicle body, whereby the vehicle body is adapted to oscillate on the said spring plate.

3. In a vehicle comprising forward and rear axles, wheels supporting said axles, guiding means for the forward axle, and a vehicle body, the combination with the axles, a spring plate, and means for connecting the spring plate with the respective forward and rear axles, means for connecting the vehicle body between its ends with the spring plate, means acting to guide the ends of the vehicle in a rising and falling movement, and means on the vehicle body co-acting with the spring plate to prevent lateral oscillations of the body of the vehicle.

4. In a vehicle comprising forward and rear axles and axle supporting wheels, a vehicle body and a spring plate supported by the axles, an attachment connecting the intermediate portion of the body with the spring plate and a pivoted loop on the body engaging with the end portion of the spring plate.

5. In a child's vehicle comprising forward and rear axles and wheels on said axles, an oscillating vehicle body, an axle post on said forward axle, a steering shaft on the axle post, a spring plate connected with and supporting the oscillating vehicle body and having a bearing on the axle post and a spring tensioning device interplaced between said body and the spring plate.

6. In a child's vehicle comprising forward and rear axles and supporting wheels, an oscillating vehicle body, an axle post on said forward axle and a steering shaft on said post, a spring plate supporting said vehicle body and having a bearing on the axle post, and a plate secured to the underside of the vehicle body and an adjusting screw carried by the plate and bearing on said body.

7. In a child's vehicle comprising forward and rear axles and supporting wheels, an oscillating vehicle body, an axle post on said forward axle, and a steering shaft, a spring plate connected with and supporting the vehicle body intermediate its forward and rear ends and a guiding device on the rear axle controlling the rise and fall of said rear end of the vehicle body on said rear axle.

8. In a child's vehicle comprising a forward axle post and a wheel carried by said post, and a rear axle, a steering shaft carried by the axle post, a vehicle body, body guiding means, guiding the rear end of the vehicle body in an upward movement on the rear axle and a spring bar connected with and supporting said vehicle body having a bearing at its forward end upon said axle post and means for controlling the upward movement of said rear end of the vehicle body.

9. In a child's vehicle comprising a rear axle and a forward forked axle post, a wheel carried by said post and wheels on said rear axle, a vehicle body, a steering shaft connected with said axle post, and guiding means for said body on the steering shaft on the forward portion of said vehicle body, a downwardly and rearwardly extended curved spring plate connected with the body of the vehicle and also connected with said rear axle and supporting said vehicle body in a rising and falling movement.

10. In a child's vehicle comprising a rear axle and a forward forked axle post a wheel carried by said post and wheels on said rear axle, a vehicle body, a steering shaft connected with said axle post and guiding means for the forward portion of said vehicle body with said steering shaft at the forward portion of said vehicle body, a downwardly and rearwardly extended spring plate or bar, connected with the lower portion of said vehicle body and also connected with the rear axle of the vehicle and guiding devices upon said rear axle, adapted to guide the rear end of said vehicle body in a rising and falling movement.

11. In a child's vehicle comprising a rear axle and a forward forked axle post, a wheel carried by said post and wheels on said rear axle, a vehicle body, a steering shaft connected with said forked axle post, and guiding means for the forward portion of said vehicle body on said steering shaft, a downwardly and rearwardly extended spring plate or bar connected with the lower portion of said vehicle body and also connected with the rear axle of the vehicle and means for controlling the rear end of said vehicle body in a rising and falling movement relative to the rear axle and lateral oscillations of the body of the vehicle.

12. In a child's vehicle comprising a rear axle and a forward forked axle post a wheel carried by said post and wheels on said rear axle, a vehicle body, a steering shaft connected with said forked axle post and guiding means on the forward position of said body, adapted to receive the steering shaft, a downwardly and rearwardly extended spring plate or bar connected with the lower portion of said vehicle body between its ends, and also connected with the rear axle and a guiding bolt for the rear end of said vehicle body on said rear axle for guiding said rear end of said vehicle body in a rising and falling movement.

ALFRED T. TIRADO.